US010045377B2

(12) United States Patent
Höglund et al.

(10) Patent No.: US 10,045,377 B2
(45) Date of Patent: Aug. 7, 2018

(54) METHOD FOR MANAGING A WIRELESS DEVICE

(71) Applicant: Telefonaktiebolaget LM Ericsson (publ), Stockholm (SE)

(72) Inventors: Andreas Höglund, Solna (SE); Jonas Kronander, Knivsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 121 days.

(21) Appl. No.: 15/116,098

(22) PCT Filed: Feb. 21, 2014

(86) PCT No.: PCT/SE2014/050221
§ 371 (c)(1),
(2) Date: Aug. 2, 2016

(87) PCT Pub. No.: WO2015/126298
PCT Pub. Date: Aug. 27, 2015

(65) Prior Publication Data

US 2017/0188386 A1 Jun. 29, 2017

(51) Int. Cl.
*H04W 4/00* (2018.01)
*H04W 74/08* (2009.01)
(Continued)

(52) U.S. Cl.
CPC ....... *H04W 74/0808* (2013.01); *H04L 5/0048* (2013.01); *H04W 4/70* (2018.02);
(Continued)

(58) Field of Classification Search
None
See application file for complete search history.

(56) References Cited

U.S. PATENT DOCUMENTS

2013/0165134 A1 6/2013 Touag et al.

FOREIGN PATENT DOCUMENTS

| | | | |
|---|---|---|---|
| EP | 2542015 | A1 | 1/2013 |
| WO | 2012051151 | A1 | 4/2012 |
| WO | 2013187753 | A2 | 12/2013 |

OTHER PUBLICATIONS

Wang, Qing, et al., "Dynamic Spectrum Allocation under Cognitive Cell Network for M2M Applications," Conference Record of the Forty Sixth Asilomar Conference on Signals, Systems and Computers (ASILOMAR), Nov. 4-7, 2012, Pacific Grove, California, IEEE, pp. 596-600.

(Continued)

*Primary Examiner* — Farah Faroul
(74) *Attorney, Agent, or Firm* — Sage Patent Group

(57) ABSTRACT

A method, in a network node, for managing a wireless device is disclosed. The method comprises conducting spectrum opportunity detection within a spectrum band and indicating a result of the spectrum opportunity detection to the wireless device. For the purposes of the method, a spectrum opportunity comprises a channel within the spectrum band which is at least temporarily available for use by the wireless device. Also disclosed is a method in a wireless device in a network. The method comprises detecting an indication of a result of spectrum opportunity detection conducted by a network node within a spectrum band and if the indication indicates a detected spectrum opportunity, conducting one of a transmission or reception operation on the detected spectrum opportunity. Also disclosed are a computer program product for carrying out the above methods, a network node and a wireless device.

32 Claims, 5 Drawing Sheets

(51) Int. Cl.
*H04W 16/14* (2009.01)
*H04W 72/04* (2009.01)
*H04L 5/00* (2006.01)
*H04W 48/16* (2009.01)
*H04W 4/70* (2018.01)
*H04W 76/28* (2018.01)

(52) U.S. Cl.
CPC .......... *H04W 16/14* (2013.01); *H04W 48/16* (2013.01); *H04W 72/0453* (2013.01); *H04W 76/28* (2018.02)

(56) References Cited

OTHER PUBLICATIONS

International Search Report and Written Opinion for International Patent Application No. PCT/SE2014/050221, dated Dec. 5, 2014, 12 pages.

METHOD FOR MANAGING A WIRELESS DEVICE

This application is a 35 U.S.C. § 371 national phase filing of International Application No. PCT/SE2014/050221, filed Feb. 21, 2014, the disclosure of which is incorporated herein by reference in its entirety.

TECHNICAL FIELD

The present invention relates to a network node and to a method, in a network node, for managing a wireless device. The present invention also relates to a wireless device and to a method in a wireless device.

BACKGROUND

Cellular communications networks continue to experience rapid growth, with the volume of data traffic in mobile broadband (MBB) in particular increasing exponentially. Spectrum resources carrying MBB data are already congested, and it is likely that the frequency bands currently in use will be insufficient to support this increasing traffic in the coming years.

In addition to the growing volume of data traffic, the number of devices connected via cellular communications networks is also forecast to increase substantially in the near future, and it is expected that machine devices (MD) will contribute significantly to this forecast increase in connected devices. Machine devices are autonomous, often very small devices typically associated with equipment or apparatus as opposed to a human user. MDs use cellular or other types of communication networks to communicate with an application server, which may or may not be comprised within the cellular network. The application server receives information from the MD and configures the MD remotely. MDs thus typically access the cellular network more or less infrequently, transmitting and receiving very small amounts of data, or being polled for data. MDs represent a subset within the larger category of User Equipment devices (UEs), and may also be referred to as machine type communication (MTC) devices or machine to machine (M2M) devices. Massive machine communication (MMC) refers to the deployment of such devices on a very large scale, and MTC devices appropriate for such deployment may thus also be referred to as massive machine communication (MMC) devices.

In the context of the above discussed demands on spectrum resources for MBB traffic, identifying spectrum resources to support future large scale deployment of MMC devices is highly challenging. In addition, predicted scenarios for MMC deployment impose very high requirements on geographic coverage. For example, the "Massive deployment of sensors and actuators" test case in the EU project METIS (Mobile and wireless communications Enablers for the Twenty-twenty Information Society), imposes a coverage requirement of 99.99% of land area. It is highly unlikely that it will prove economically viable for network operators to support the site acquisition and other costs involved in enabling such coverage, particularly in remote areas where a site may be required to service only a small number of customers. Operation of MMC devices at lower frequency bands has been offered as a potential solution to this coverage problem. However, the lower region of the spectrum chart is very heavily congested, and the issue of spectrum resource allocation therefore remains highly challenging.

Opportunistic spectrum access, also known as cognitive radio, is an area of research seeking to achieve more efficient use of available spectrum bands. While promising results have been observed, the operation of opportunistic spectrum access is dependent upon extensive sensing and spectrum opportunity detection activities. The power consumed in conducting such activities would be highly detrimental to UE battery life. For MMC devices, which, owing to their nature and use patterns are required to be highly energy efficient, such power consumption would be devastating to device operational lifespan. Additional demands on battery power would also be contrary to the ongoing aim of improving battery life for UEs. For example, a goal of the EU METIS project is to achieve a ten times increase in device battery life.

SUMMARY

It is an aim of the present invention to provide methods and apparatus which obviate or reduce at least one or more of the challenges mentioned above.

According to an aspect of the present invention, there is provided a method, in a network node, for managing a wireless device. The method comprises conducting spectrum opportunity detection within a spectrum band and indicating a result of the spectrum opportunity detection to the wireless device. A spectrum opportunity comprises a channel within the spectrum band which is at least temporarily available for use by the wireless device.

Aspects of the present invention thus enable a wireless device to benefit from secondary or opportunistic spectrum access by placing the burden of spectrum opportunity detection on a network node managing the wireless device. Spectrum opportunity detection, with its inherent power consumption cost, is conducted at the network node, and a result of the spectrum opportunity detection is indicated to the wireless device. The wireless device is then able to make use of identified spectrum opportunities while minimising its own power consumption.

According to some embodiments, conducting spectrum opportunity detection within a spectrum band may comprise performing at least one of: interrogating a memory of the network node, interrogating a data management entity, interrogating another network node or sensing within the spectrum band. In some examples, interrogating a memory of the network node may comprise checking estimates for a time period when particular spectrum resources are available. Interrogating a data management entity may comprise performing a database lookup, for example in a register of spectrum license holders. Interrogating another network node may comprise instructing another network node to conduct a database lookup, or obtaining spectrum opportunity information from the other network node. Sensing may comprise listening for signals transmitted on the channels of the spectrum band.

According to some embodiments, if a spectrum opportunity is detected, indicating a result of the spectrum opportunity detection to the wireless device may comprise transmitting a signal to the wireless device.

According to some embodiments, the signal may comprise a Spectrum Access Grant (SAG) message, which message may comprise an identification of the spectrum opportunity.

According to further embodiments, the signal may comprise an availability flag or may comprise a pilot signal, which pilot signal may be transmitted on the identified spectrum opportunity. According to further embodiments, the signal may comprise any downlink control signalling transmitted on the identified spectrum opportunity.

According to some embodiments, if the spectrum opportunity detection does not detect a spectrum opportunity, indicating a result of the spectrum opportunity detection to the wireless device may comprise transmitting a signal to the wireless device. According to some embodiments, the signal may comprise a Spectrum Access Denied (SAD) message, or may comprise an availability flag.

According to some embodiments, if the spectrum opportunity detection does not detect a spectrum opportunity, indicating a result of the spectrum opportunity detection to the wireless device may comprise withholding transmission of a signal to the wireless device. The withheld signal may comprise a pilot signal or may comprise a Spectrum Access Grant message or may comprise other downlink control signalling.

According to some embodiments, the method may further comprise instructing the wireless device to conduct one of sending an uplink transmission or listening for a downlink transmission on a detected spectrum opportunity. In some examples, the network node and wireless device may be licensed to use a spectrum band other than the spectrum band in which spectrum opportunity detection is conducted. According to such examples, instructing the wireless device to conduct one of sending an uplink transmission or listening for a downlink transmission on a detected spectrum opportunity may comprise sending a message to the wireless device over a channel within the band in which the network node and wireless device are licensed to operate. In some examples, the method may further comprise sending, by the network node, a downlink transmission on the detected spectrum opportunity.

According to other embodiments, the network node may comprise a radio access node such as a base transceiver station (BTS) or a NodeB. According to some embodiments, the network may be an Evolved Packet System (EPS)/Long Term Evolution (LTE) network, and the network node may comprise an eNodeB. According to other embodiments, the network may be a device-to-device (D2D) communication or capillary network using any contention based air interface in unlicensed Industrial, Scientific and Medical (ISM) spectrum. Examples of such networks include ZigBee® and Bluetooth®.

According to some embodiments, the wireless device may comprise a User Equipment device, and may comprise a Machine Type Communication device.

According to some embodiments, the method may further comprise checking a discontinuous reception, DRX, cycle for the wireless device and timing the conducting of spectrum opportunity detection and indicating a result of the spectrum opportunity detection to the wireless device according to the DRX cycle of the wireless device. In some examples, timing may comprise conducting spectrum opportunity detection immediately before DRX wake up of a managed wireless device and indicating a result of spectrum opportunity detection during wireless device wake up. In other examples, the network node may indicate a result of spectrum opportunity detection over a period of time during which it may be calculated that the managed wireless device DRX cycle will transition to wake up.

According to some embodiments, the spectrum band may comprise a licensed spectrum band within which the network node and wireless device are not licensed to operate, and a channel may be available for use by the wireless device if the spectrum opportunity detection determines that no licensed user is using the channel.

According to further embodiments, the spectrum band may comprise one of a licensed spectrum band within which the network node and wireless device are licensed to operate, or an unlicensed spectrum band. According to such embodiments, a channel may be available for use by the wireless device if use of the channel by the wireless device would cause interference to other users of the band that would be below a threshold level.

According to further embodiments, the spectrum band may comprise a guard band adjacent a licensed spectrum band, and a channel may be available for use by the wireless device if use of the channel by the wireless device would cause interference to users of the adjacent licensed band that would be below a threshold level.

According to another aspect of the present invention, there is provided a method, in a wireless device in a network. The method comprises detecting an indication of a result of spectrum opportunity detection conducted by a network node within a spectrum band, and, if the indication indicates a detected spectrum opportunity, conducting one of a transmission or reception operation on the detected spectrum opportunity. A spectrum opportunity comprises a channel within the spectrum band which is at least temporarily available for use by the wireless device.

According to some embodiments the method may further comprise, if the indication indicates a detected spectrum opportunity, retrieving an identification of the spectrum opportunity corresponding to the indication from a memory.

According to some embodiments the method may further comprise, if the indication indicates a detected spectrum opportunity, retrieving an identification of the spectrum opportunity corresponding to the indication from the indication.

According to some embodiments, the indication may comprise a message.

According to some embodiments, the indication may comprise a pilot signal received on the detected spectrum opportunity. According to further embodiments, the indication may comprise any downlink control signalling received on the detected spectrum opportunity.

According to some embodiments, the method may further comprise checking if the wireless device has data to be sent.

According to some embodiments, the method may further comprise, if the indication indicates no detected spectrum opportunity, resuming detection of an indication of a result of spectrum opportunity detection conducted by a network node after a threshold time period.

In some examples, the threshold time period may comprise the DRX cycle time of a wireless device, which may for example be a user equipment device such as an MTC device. In such examples, if a received indication shows that no spectrum opportunity has been detected, the UE device may go back to DRX sleep and may check again for a new indication at the next DRX wake up time.

According to some embodiments, the wireless device may comprise a user equipment device and may comprise a Machine Type Communication device.

According to another aspect of the present invention, there is provided a computer program product, configured when run on a computer to conduct a method according to any one of the preceding aspects of the invention.

According to another aspect of the present invention, there is provided a network node comprising an opportunity detection unit, configured to conduct spectrum opportunity detection within a spectrum band, and a communication unit, configured to indicate a result of the spectrum opportunity detection conducted by the detection unit to a wireless device managed by the network node. A spectrum opportunity comprises a channel within the spectrum band which is at least temporarily available for use by the wireless device.

According to another aspect of the present invention, there is provided a wireless device comprising an indication detection unit configured to detect an indication of a result of spectrum opportunity detection conducted by a network node within a spectrum band, and a communication unit configured, if the indication indicates a detected spectrum opportunity, to conduct one of a transmission or reception operation on the detected spectrum opportunity. A spectrum opportunity comprises a channel within the spectrum band which is at least temporarily available for use by the wireless device.

According to another aspect of the present invention, there is provided a network node comprising a processor and a memory, the memory containing instructions executable by the processor whereby the network node is operative to conduct spectrum opportunity detection within a spectrum band and indicate a result of the spectrum opportunity detection to the wireless device. A spectrum opportunity comprises a channel within the spectrum band which is at least temporarily available for use by the wireless device.

According to another aspect of the present invention, there is provided a wireless device comprising a processor and a memory, the memory containing instructions executable by the processor whereby the wireless device is operative to detect an indication of a result of spectrum opportunity detection conducted by a network node within a spectrum band and if the indication indicates a detected spectrum opportunity, conduct one of a transmission or reception operation on the detected spectrum opportunity. A spectrum opportunity comprises a channel within the spectrum band which is at least temporarily available for use by the wireless device.

BRIEF DESCRIPTION OF THE DRAWINGS

For a better understanding of the present invention, and to show more clearly how it may be carried into effect, reference will now be made, by way of example only, to the following drawings in which.

DETAILED DESCRIPTION

The present invention provides methods, a computer program product and apparatus enabling a wireless device to profit from opportunistic spectrum access while avoiding the excessive power costs associated with such access. Embodiments of the invention are discussed below with reference to a machine type device operating within an Evolved Packet System (EPS)/Long Term Evolution (LTE) network, however it will be appreciated that the methods, apparatus and computer program products discussed below are equally applicable to different types of wireless device operating within different cellular networks.

Figure 1:
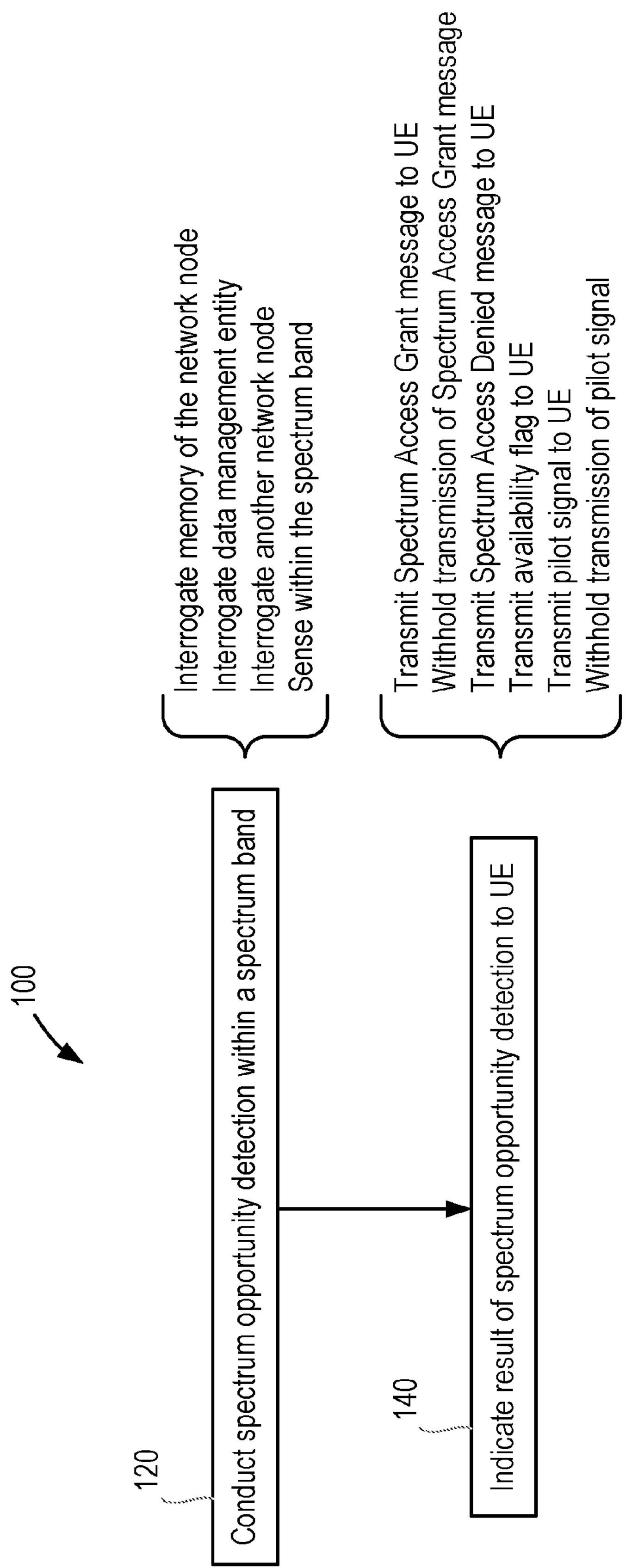
FIG. 1 is a flow chart illustrating process steps in a method for managing a wireless device.

With reference to FIG. 1, a method 100, in a network node, for managing a wireless device such as a user equipment device or UE, comprises a first step 120 of conducting spectrum opportunity detection within a spectrum band, and a second step 140 of indicating a result of the spectrum opportunity detection to the managed UE.

Within the context of the method, a spectrum opportunity comprises a channel within the spectrum band which is at least temporarily available for use by the UE. The conditions for availability of a channel may be defined according to particular use cases for the method, and/or particularities of the spectrum band user consideration. In a first example, the spectrum band within which spectrum opportunity detection is conducted may comprise at least part of a spectrum band which is licensed to a network other than that of which the network node is a part, and thus within which the network node and UE are not licensed to operate. In such circumstances, it is desirable to protect primary licensed users of the spectrum band, and a channel may be considered as available for use if the spectrum opportunity detection determines that no primary licensed user is using the channel. An additional interference criterion may also be imposed upon the availability of a channel, for example to ensure that interference to primary users of neighbouring channels caused by use by the UE of the channel in question would remain below a threshold level.

In other examples, interference may be the primary condition for determining availability of a channel. In some circumstances, the spectrum band within which spectrum opportunity detection is conducted may comprise at least a part of an unlicensed spectrum band. In such cases there are no primary users to protect and the main criterion is ensuring that interference to existing users within the spectrum band would remain below a threshold level. The interference that would be experienced by the UE on the channel in question as a result of other users may also be considered in order to identify channels offering acceptable or desirable levels of channel quality. Ensuring interference remains below a threshold level also assists with improving battery life, as interference collisions lead to retransmission of data, so wasting battery power.

Interference may also be an important condition for determining channel availability when spectrum opportunity detection is conducted within a spectrum band within which the network node is licensed to operate. In such circumstances the UE represents a primary user and thus has the right to use channels within the band, but it may be desirable to select a channel causing the least interference to other primary users transmitting or receiving on neighbouring channels within the band.

In a further example, spectrum opportunity detection may be conducted within a guard band adjacent to a licensed spectrum band. For example, a guard band of a mobile broadband (MBB) system may be considered for use by MTC devices. In such an example, licensed users of the adjacent mobile broadband spectrum should be protected, and a channel may be considered available for opportunistic use by an MTC device according to embodiments of the invention if use of the channel would cause interference to licensed users of the adjacent MBB spectrum band that is below a threshold level.

Referring again to FIG. 1, the process of conducting spectrum opportunity detection may be accomplished in different ways, according to the use case and particular circumstances in which the method is employed. In a first example, conducting spectrum opportunity detection may comprise interrogating a memory of the network node. In certain use cases, the availability of spectrum resources may vary over a set time period (for example 24 hours) in a substantially stable manner. Thus the network node may check the current time and interrogate an internal memory for stored estimates of channel availability at the current time. Maximum spectrum usage may be experienced at peak times during the day or early evening, and the network node may thus determine from checking its internal memory that no spectrum opportunities are likely to exist at such peak hours. However during the early hours of the morning or other particularly quiet times, the network node may determine from estimates stored in its internal memory that certain channels are available, and thus that spectrum opportunities exist.

In another example, conducting spectrum opportunity detection may comprise interrogating a data management entity such as a database. Availability of some spectrum resources, including for example the lower end of the spectrum used for television broadcasting, is highly geographically dependent but relatively stable over time. Details of licensed users of such resources may be held in a licensing database which discriminates by geographic location. A network node within a particular geographic location may thus for example perform a periodic interrogation of a licensing database to determine if any new license holders have been registered in its geographic area, and which channels thus remain available for use.

In another example, conducting spectrum opportunity may comprise sensing within the spectrum band. Thus the network node may sense channels within the spectrum band to establish the presence of primary or other users and to determine interference levels that could be caused by use of the sensed channels.

In another example, conducting spectrum opportunity detection may comprise interrogating another network node, which other network node may for example have the data or functionality necessary to detect spectrum opportunities using any of the above operations. In such a manner, spectrum opportunity detection activities may be delegated to a particular network node, offering increased efficiency where several network nodes are located in close proximity. In some examples, a network node may instruct another network node to conduct any of the above operations and so detect spectrum opportunities and inform the network node of detected spectrum opportunities.

It will be appreciated that any suitable combination of the above activities may be conducted in order to detect spectrum opportunities at step 120 of the method 100.

Referring again to FIG. 1, after conducting spectrum opportunity detection within a spectrum band, the network node proceeds at step 140 to indicate a result of the spectrum opportunity detection to the managed UE. Indicating a result of spectrum opportunity detection may comprise transmitting or withholding a message or signal to the UE, as discussed in further detail below.

In a first example, indicating a result of spectrum opportunity detection may comprise sending one of a Spectrum Access Grant (SAG) or a Spectrum Access Denied (SAD) message to the UE. The SAG and SAD messages may include details of the resources to which they apply, for example channel frequencies, or may be simple indications of a positive or negative result of spectrum opportunity detection.

In a variation of the above example, instead of sending a SAD message in the event of no spectrum opportunity being detected, the network node may simply withhold transmission of a SAG message. Timing considerations associated with transmission of SAG and SAD messages, and withholding of SAG messages, are discussed below with reference to FIG. 2.

As noted above, SAG and SAD messages may include an identification of the resources to which they apply. Thus a SAG message may indicate that access to a particular channel is now granted or denied. In other examples, the SAG and SAD messages may be more simple, indicating only a positive or negative result of spectrum opportunity detection. In a most basic embodiment of SAG and SAD messages, the messages may be reduced to a single bit: a simple availability flag which may be set to indicate a positive result of spectrum opportunity detection, and not set to indicate a negative result of spectrum opportunity detection. In such cases, the UE may be programmed with an identification of a single or a plurality of channels to which the flag or flags apply. Thus the UE may interpret reception of a particular flag as granted or denied access to the channel to which the flag corresponds. A correspondence table of flags and channel identifiers may be stored within a memory of the UE.

SAG and SAD messages, and availability flags, may all be transmitted on channels within a licensed band of the network to which the network node belongs, for example included with a paging message in any other broadcast. Thus the indication of result may be transmitted within a licensed band of the network, indicating grant or denial of access to channels outside the licensed band of the network (for example in the unlicensed band or in a band licensed to another network or operator).

In another example, the network node may indicate a positive result of spectrum opportunity detection by transmitting a pilot signal on the detected spectrum opportunity. The UE may thus interpret reception of the pilot signal on the detected spectrum opportunity as grant of access to use the channel on which the pilot signal is received. In the case of later spectrum access denial, the network node will withhold the pilot signal, ceasing its transmission of the pilot signal on that channel, and the UE will interpret the absence of the pilot signal on that channel as an indication that access to that channel has been denied. In additional examples, other downlink control signalling, or either the availability flag or the SAG message may also be transmitted on a detected spectrum opportunity, as opposed to a channel within a licensed band of the network to which the network node belongs.

The selection and timing of different options for indicating a result of spectrum opportunity detection are discussed below with reference to FIG. 2.

Figure 2:
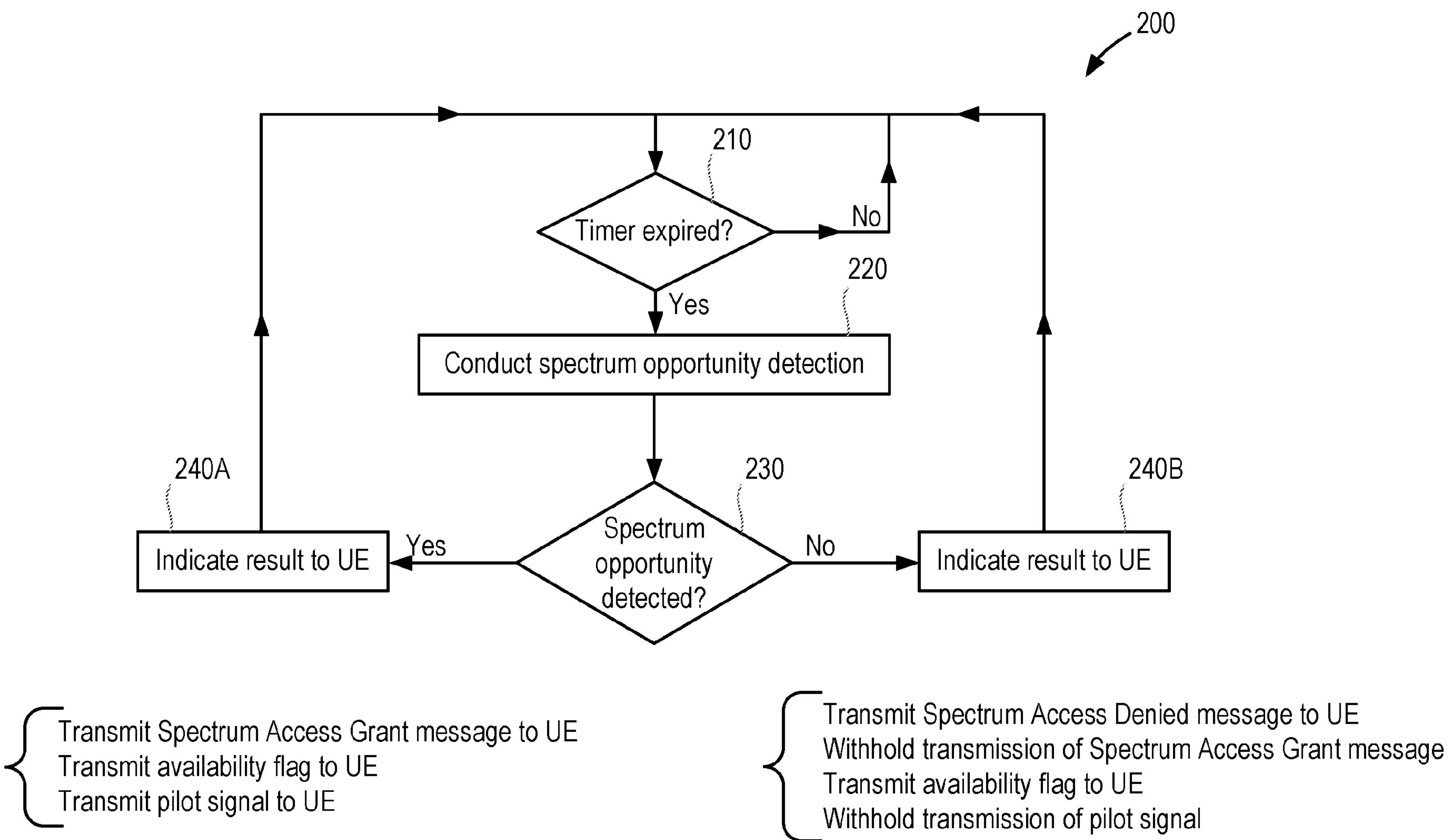
FIG. 2 is a flow chart illustrating additional detail in a method according to FIG. 1.

FIG. 2 illustrates steps in a method 200 in a network node for managing a UE. The method 200 comprises additional steps with respect to the method 100, showing one way in which the functionality of the method 100 may be implemented. With reference to FIG. 2, in a first step 210, the network node checks for expiry of a timer. If the timer has not expired, the network node continues to check for expiry until the timer does expire. The purpose of the timer checked in step 210 is discussed below. If the network node discovers at step 210 that the timer has expired, the network node proceeds to step 220 in which spectrum opportunity detection is conducted. This may involve any combination of the spectrum opportunity detection activities discussed above with respect to FIG. 1. Having completed spectrum opportunity detection, the network node determines at step 230 whether or not a spectrum opportunity has been detected. In either case ("Yes" or "No" in response to step 230), the result of the spectrum opportunity detection is indicated to the UE. The form that the indication takes is determined in a first instance by the result and then according to the particular example of the method running on the network node. For example if a spectrum opportunity is detected ("Yes" at step 230), the indication of result may take the form of transmission of a SAG message, transmission of a set availability flag or transmission of a pilot signal or other control signalling on the detected spectrum opportunity. If no spectrum opportunity is detected ("No" at step 230), the indication may take the form of transmission of a SAD message, transmission of an unset availability flag or withholding of a pilot signal, other control signalling or SAG message which could otherwise be transmitted on a detected spectrum opportunity.

The timer checked in step 210 controls the timing of the conducting of spectrum opportunity detection and hence the subsequent indication of results. The frequency with which spectrum opportunity detection should be conducted may vary according to the spectrum band within which it is conducted and/or the nature of the UEs managed by the network node. Spectrum opportunity detection may be conducted on a short term basis, for example in situations where a high premium is placed on primary user protection, or on a more long term basis. Geographical factors may also be taken into account, for example in a network node in an inland, mountainous location, only relatively infrequent detection may be required in a band licensed to a coast guard operation. Conversely, for a network node in a coastal location, very frequent detection in the coast guard band, corresponding to very high primary user protection, may be imposed. In a further example, opportunities in spectrum bands in which availability varies relatively rapidly should be detected more frequently than is the case for spectrum bands in which spectrum availability is very steady over time. Thus the frequency with which spectrum opportunity detection is conducted may vary for example from once every hour to once every week. In addition, certain UEs may require spectrum resources more or less frequently than others. As discussed above, machine type devices are likely to place growing demands on spectrum resources in the coming years. However, such devices often only need to access the network relatively infrequently and for a short period of time. Thus for UEs only requiring network access once a day, a single daily spectrum opportunity detection may be sufficient.

In addition to managing the frequency with which spectrum opportunity detection is conducted, the timer of step 210 may serve to coordinate the conducting of spectrum opportunity detection with the DRX cycle time of the managed UE or UEs. The timer may enable the network node to time the conducting of spectrum opportunity detection, and indicating a result to a managed UE, according to the UE's DRX cycle. Machine type devices have comparatively long DRX cycles, and have only a very limited wake up time. The limited power resources available to MTC devices favour efficient operation with extended DRX cycles. It may thus be desirable to time the conducting of spectrum opportunity detection such that it takes place immediately preceding the DRX wakeup time of a managed UE, allowing the indication of an up to date result of spectrum opportunity detection to be provided during UE wake up time. In the case of a network node managing several UEs, the indication may be provided over a period of time that is sufficiently long to ensure that the all DRX cycles of managed UEs will have transitioned to the wakeup state at least once during the time period.

In the interests of robustness, it may be desirable to select an indication option according to timing constraints imposed by the use case and the UEs being managed by the network node. For example, where many UEs are being managed, and it is difficult to identify a reasonable time period within which all UEs will have transitioned to wake up state, it may be desirable to select a transmission or withholding of a pilot signal as the method of indication of result. The pilot signal is constantly transmitted on the detected spectrum opportunity for as long as the channel concerned remains a spectrum opportunity. Thus regardless of when a particular UE DRX cycle ends, the UE receives an unambiguous indication of result in the presence or absence of a pilot signal on a particular channel.

Figure 3:
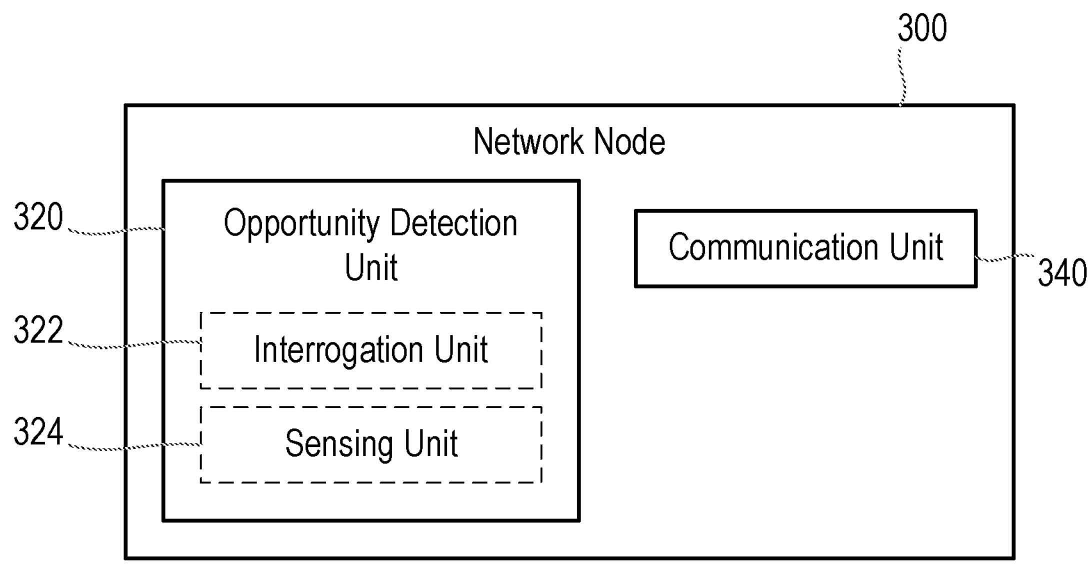
FIG. 3 is a block diagram illustrating functional units of a network node.

The network node at which the methods 100 and 200 are conducted may for example be a radio access node via which the UE accesses the network. In the present example of an LTE network, the network node may be an eNodeB. In other examples, the network node may be a base station transceiver or NodeB, or may be any other network node capable of managing a wireless device accessing the network. FIG. 3 is a diagram illustrating functional units of a network node suitable for carrying out the above described methods, for example in accordance with instructions received from a computer program stored on a computer readable medium. Referring to FIG. 3, the node 300 comprises an opportunity detection unit 320, configured to conduct spectrum opportunity detection within a spectrum band, and a communication unit 340, configured to indicate a result of the spectrum opportunity detection to a managed UE. In some examples, the opportunity detection unit 320 may comprise an interrogation unit 322, configured to interrogate a memory of the network node, another network node or an external data management unit, and a sensing unit 324, configured to sense channels within the spectrum band. It will be appreciated that the units of the illustrated network node are functional units, and may be realised in any appropriate combination of hardware and/or software. Additional functional units may also be present in the node.

Figure 4:
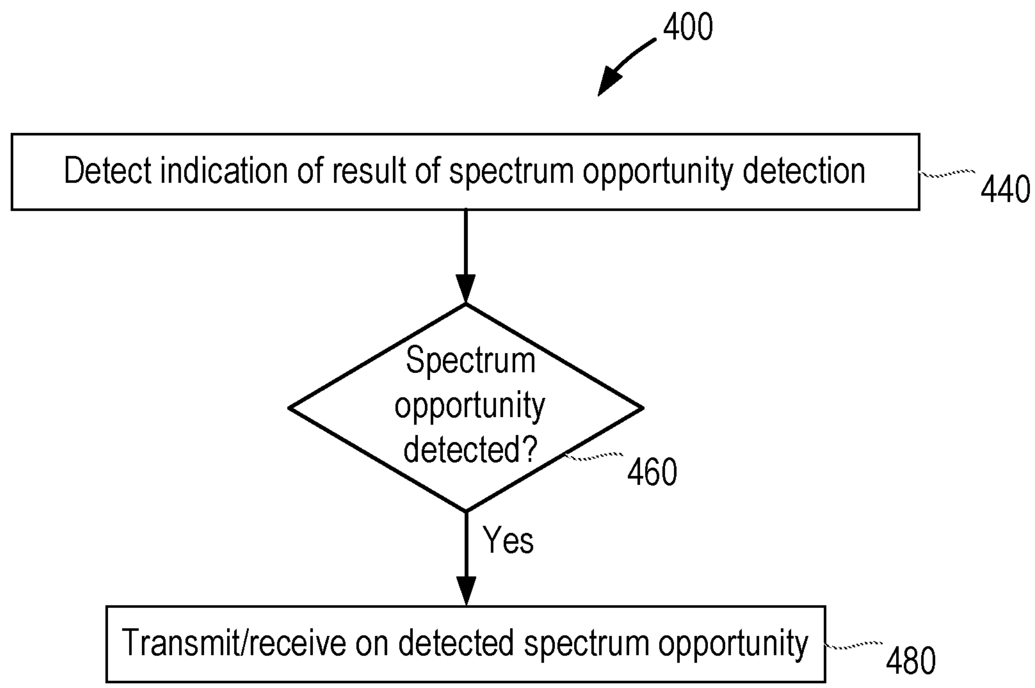
FIG. 4 is a flow chart illustrating process steps in a method in a wireless device.

FIG. 4 illustrates process steps in a method in a wireless device, such as a UE, which may be an MTC device. The UE may be managed by a network node such as an eNodeB, for example according to examples of the methods 100, 200 described above. Referring to FIG. 4, in a first step 450, the UE detects an indication of a result of spectrum opportunity detection conducted in a spectrum band, for example by the network node managing the UE. The UE then determines, at step 460 whether the indication shows that a spectrum opportunity has been detected. If a spectrum opportunity has been detected, the UE proceeds to step 480, in which at least one of a transmit or receive operation is conducted on the detected spectrum opportunity. As noted above, within the context of the methods of the present invention, a spectrum opportunity comprises a channel within the spectrum band which is at least temporarily available for use by the UE. The conditions for availability of a channel may be defined according to particular use cases for the method, and/or particularities of the spectrum band user consideration, as discussed above. It will be appreciated that the UE does not have to perform any activities associated with detecting a spectrum opportunity, the UE merely detects an indication of a result of spectrum opportunity detection, and if the result is positive, makes use of the detected spectrum opportunity. Aspects of the method of FIG. 4 thus enable the UE to make opportunistic use of channels within a spectrum band without having to conduct expensive spectrum opportunity detection within that band.

As noted above, the indication of a result of spectrum opportunity detection may take the form of a message or signal received from a network node, or may comprise the withholding of a particular signal. A full discussion of different options for indicating a result of spectrum opportunity detection is provided above with reference to FIG. 1.

Figure 5:
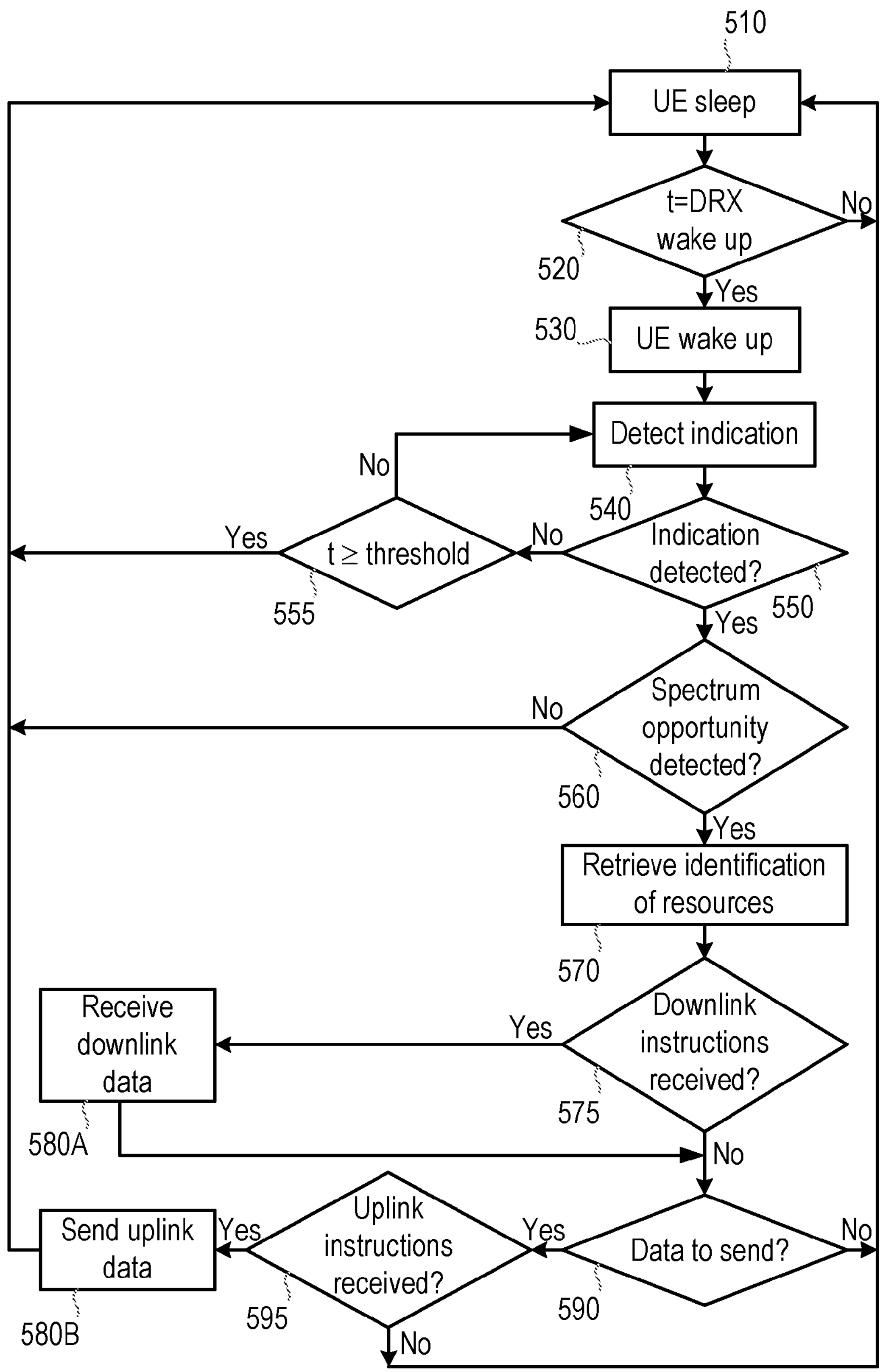
FIG. 5 is a flow chart illustrating additional detail in a method according to FIG. 4.

FIG. 5 illustrates one way in which the functionality of the method of FIG. 4 may be implemented in a UE. FIG. 5 is discussed below with reference to an example UE in the form of an MTC device, however it will be appreciated that this is merely for the purposes of illustration.

With reference to FIG. 5, in a first step 510, the UE is in sleep mode and in a second step 520 the UE checks a timer to determine whether, according to the UE's DRX cycle, it is time to wake up. The length of the DRX cycle of the UE may vary from zero to any appropriate time length greater than zero. Once the time reaches DRX wake up, the UE proceeds to wake up and listen for downlink control signalling and/or paging from a network node at step 530. The UE then attempts to detect an indication of a result of spectrum opportunity detection at step 540. The process of detecting an indication may vary according to the form of the indication. For example, in one embodiment, the UE may receive a message, such as a SAG or SAD message from a controlling radio access node. In another example, a resource availability flag in a message may be set or unset. In still further examples, the UE may scan a specific channel or group of channels within a particular spectrum band, to determine if a controlling radio access node (such as an eNodeB) is transmitting a pilot signal or any other downlink control signalling on any of the channels in the group.

The UE then checks at step 550 whether an indication has been detected. If no indication can be detected ("No" at step 550), the UE continues to attempt to detect an indication up to a threshold time via a time check at step 555. If after the threshold time period has passed, the UE has still not detected an indication of a result of spectrum opportunity detection, the UE returns to step 510, entering sleep mode, and can try again to detect an indication after the next DRX cycle. If an indication is detected by the UE ("Yes" at step 550), the UE then determines whether or not a spectrum opportunity has been detected at step 560 (i.e. is the result of the opportunity detection positive or negative). If a spectrum opportunity has not been detected (indicated for example by receipt of a SAD message, an unset availability flag or the absence of a pilot signal on the relevant channel), the UE returns to step 510, entering sleep mode, and will attempt to detect an indication again after the next DRX cycle, by which time a spectrum opportunity may have been detected.

If a spectrum opportunity has been detected, the UE then retrieves an identification of the resources to which the positive indication relates at step 570. As discussed above, in the case of a SAG message, the resources available may be directly indicated in the message, and the UE may thus extract the identification of the detected spectrum opportunity from the indication itself, i.e. from the SAG message. Alternatively, the indication may comprise a simple flag, and the UE may consult an internal memory to obtain the identification of the spectrum resource to which the flag relates. In a further example, the indication may comprise transmission of a pilot signal or other downlink control signalling on a detected spectrum opportunity, in which case the UE may determine that the spectrum opportunity comprises the channel on which the pilot or other signalling is received. Alternatively, the UE may refer to an internal memory to retrieve details of a pre-configured uplink channel, the availability of which is indicated by receipt of the downlink signalling on a detected spectrum opportunity. Having identified the channel which constitutes the detected spectrum opportunity, the UE then proceeds at step 575 to check whether downlink instructions have been received. Downlink instructions may for example be included within the downlink control signalling for which the UE listens on wakeup at step 530, and may instruct the UE to listen for downlink data on the detected spectrum opportunity. If downlink instructions have been received ("Yes" at step 575), the UE proceeds at step 580A to receive downlink data by listening on the appropriate channel.

Once downlink data has been received, or if the UE has not received any downlink instructions ("No" at step 575), the UE then proceeds to check if it has data to send in step 590. If the UE has no data to send ("No" at step 590) the UE returns to step 510, entering sleep mode, and will repeat the process of detecting an indication and checking for instructions and uplink data in the next DRX cycle. If the UE has data to send it then checks at step 595 whether uplink instructions have been received. Uplink instructions may for example be included within control signalling for which the UE listens on wakeup at step 530, and may instruct the UE to send particular data on the detected spectrum opportunity. Uplink instructions may also comprise an uplink SAG message detailing a detected spectrum opportunity for uplink transmissions. If uplink instructions have been received ("Yes" at step 595), the UE proceeds to prepare and send its uplink data at step 580B. This uplink data may be of any nature according to the type of device and deployment situation, and the UE may prepare this data in any appropriate manner. In one example, the UE may prepare uplink data by reading from sensors or taking other equipment measurements or accumulating the relevant data from an internal memory. Having sent the uplink data, the UE then returns to step 510 and enters the sleep state until the next DRX cycle completes.

It will be appreciated that variations of the above described method may be contemplated, for example briefly re-entering the sleep state before sending uplink data. In other examples, various of the above discussed method steps may be performed in a different order to that described, for example a UE may perform steps to transmit uplink data before performing steps to receive downlink data. In addition, the indication of result of spectrum opportunity detection may be accompanied by a scheduling grant, for example in networks such as LTE that use regular scheduling. In networks having persistent or semi-persistent scheduling, the UE would already have a grant and so would not require any further information in order to know at which resource block to transmit.

Figure 6:
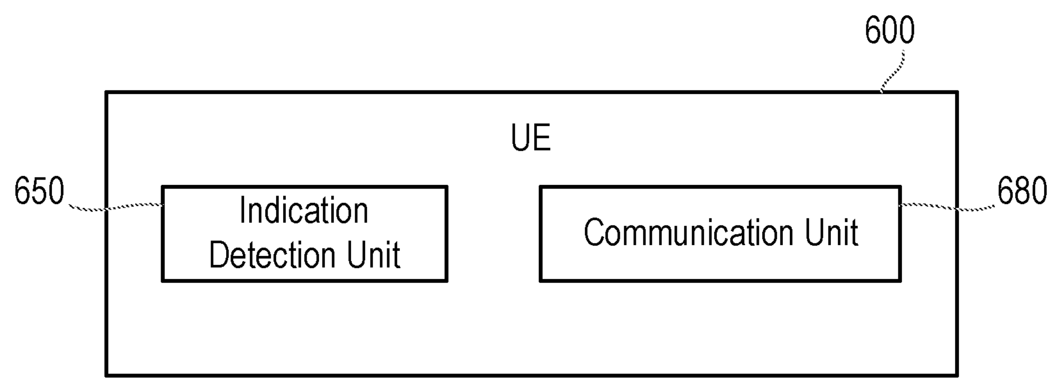
FIG. 6 is a block diagram illustrating functional units of a wireless device.

The methods 400, 500 of FIGS. 4 and 5 may be realised by a computer program which may cause a wireless device, processor or apparatus to execute the steps of the methods 400, 500. FIG. 6 is a diagram illustrating functional units of a wireless device suitable for carrying out the above described methods 400, 500, for example in accordance with instructions received from a computer program stored on a computer readable medium. Referring to FIG. 6, the wireless device 600 comprises an indication detection unit 650, configured to detect an indication of a result of spectrum opportunity detection, and a communication unit 680, configured to conduct either or both of uplink or downlink operations. It will be appreciated that the units of the illustrated wireless device are functional units, and may be realised in any appropriate combination of hardware and/or software. Additional functional units may also be present in the UE.

Figure 7:
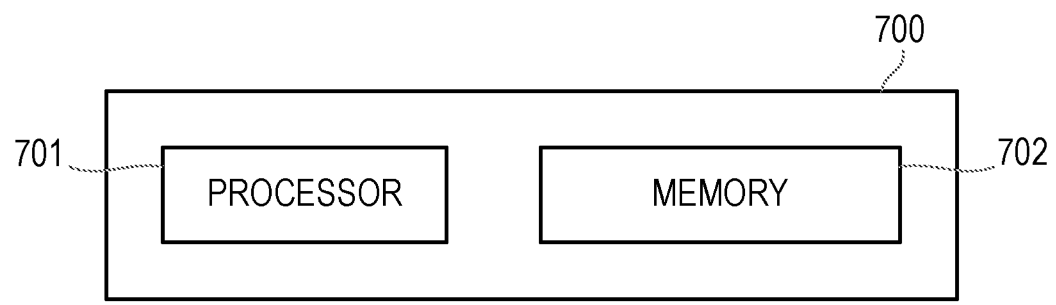
FIG. 7 is a block diagram illustrating a network element which may be a network node or a wireless device.

In further examples according to the present invention, the network node and/or wireless device may be implemented as a device 700 comprising a processor 701 and a memory 702 as illustrated in FIG. 7. The memory 702 contains instructions executable by the processor 701 such that the device 700 is operative to conduct the steps of the methods 100, 200 or 400, 500 described above as appropriate. Aspects of the above invention thus provide methods, apparatus and computer programs offering efficient resource access for wireless devices. Aspects of the invention may be particularly suited to establishing resource access for delay tolerant uplink traffic, such as may be transmitted by machine type devices, and for crowded areas of the radio frequency spectrum, such as the lower regions used for television transmissions. Aspects of the present invention offer advantages associated with opportunistic spectrum access while maintaining very low power consumption for individual wireless devices, and may thus support wireless network access for massive deployments of machine type devices. Additionally, aspects of the invention may assist in the identification of resources allowing for transmission at low interference. Transmitting at low interference enables a wireless device to transmit at lower output power, so saving power and potentially eliminating the requirement for an external power amplifier. In this manner, manufacturing costs for wireless devices may be reduced. Transmitting at low interference may also help to reduce the number of retransmissions required for a wireless device to transmit its data, so also helping to maintain low power consumption in the wireless device.

The methods of the present invention may be implemented in hardware, or as software modules running on one or more processors. The methods may also be carried out according to the instructions of a computer program, and the present invention also provides a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method, in a network node, for managing a wireless device; the method comprising:

conducting spectrum opportunity detection within a spectrum band;

indicating a result of the spectrum opportunity detection to the wireless device; and instructing the wireless device to conduct one of sending an uplink transmission or listening for a downlink transmission on a detected spectrum opportunity;

wherein a spectrum opportunity comprises a channel within the spectrum band which is at least temporarily available for use by the wireless device; and wherein the network node and wireless device are licensed to use a spectrum band other than the spectrum band on which spectrum opportunity detection is conducted, and wherein instructing the wireless device to conduct one of sending an uplink transmission or listening for a downlink transmission on a detected spectrum opportunity comprises sending a message to the wireless device over a channel within the band in which the network node and wireless device are licensed to operate.

2. A method as claimed in claim 1, wherein conducting spectrum opportunity detection within a spectrum band comprises performing at least one of:

interrogating a memory of the network node;

interrogating a data management entity;

interrogating another network node; or sensing within the spectrum band.

3. A method as claimed in claim 1, wherein, if a spectrum opportunity is detected, indicating a result of the spectrum opportunity detection to the wireless device comprises transmitting a signal to the wireless device.

4. A method as claimed in claim 3, wherein the signal comprises a Spectrum Access Grant message.

5. A method as claimed in claim 4 wherein the Spectrum Access Grant message comprises an identification of the spectrum opportunity.

6. A method as claimed in claim 3, wherein the signal comprises an availability flag.

7. A method as claimed in claim 3, wherein the signal comprises a pilot signal, which pilot signal is transmitted on the identified spectrum opportunity.

8. A method as claimed in claim 1, wherein, if the spectrum opportunity detection does not detect a spectrum opportunity, indicating a result of the spectrum opportunity detection to the wireless device comprises transmitting a signal to the wireless device.

9. A method as claimed in claim 8, wherein the signal comprises a Spectrum Access Denied message.

10. A method as claimed in claim 8, wherein the signal comprises an availability flag.

11. A method as claimed in claim 1, wherein, if the spectrum opportunity detection does not detect a spectrum opportunity, indicating a result of the spectrum opportunity detection to the wireless device comprises withholding transmission of a signal to the wireless device.

12. A method as claimed in claim 11, wherein the withheld signal comprises a pilot signal.

13. A method as claimed in claim 11, wherein the withheld signal comprises a Spectrum Access Grant message.

14. A method as claimed in claim 1, wherein the network node comprises a radio access node.

15. A method as claimed in claim 14, wherein the network node comprises one of a Base Transceiver Station, NodeB, or eNodeB.

16. A method as claimed in claim 1, wherein the wireless device comprises a Machine Type Communication device.

17. A method as claimed in claim 1, wherein the method further comprises:

checking a discontinuous reception, DRX, cycle for the wireless device; and timing the conducting of spectrum opportunity detection and indicating a result of the spectrum opportunity detection to the wireless device according to the DRX cycle of the wireless device.

18. A method as claimed in claim 1, wherein the spectrum band comprises a licensed spectrum band within which the network node and wireless device are not licensed to operate;

and wherein a channel is available for use by the wireless device if the spectrum opportunity detection determines that no licensed user is using the channel.

19. A method as claimed in claim 1, wherein the spectrum band comprises one of:

a licensed spectrum band within which the network node and wireless device are licensed to operate; or an unlicensed spectrum band;

and wherein a channel is available for use by the wireless device if use of the channel by the wireless device would cause interference to other users of the band that would be below a threshold level.

20. A method, in a wireless device in a network, the method comprising:

detecting an indication of a result of spectrum opportunity detection conducted by a network node within a spectrum band;

if the indication indicates a detected spectrum opportunity, conducting one of a transmission or reception operation on the detected spectrum opportunity; and if the indication indicates no detected spectrum opportunity, resuming detection of an indication of a result of spectrum opportunity detection conducted by a network node after a threshold time period;

wherein a spectrum opportunity comprises a channel within the spectrum band which is at least temporarily available for use by the wireless device.

21. A method as claimed in claim 20, further comprising, if the indication indicates a detected spectrum opportunity, retrieving an identification of the spectrum opportunity corresponding to the indication from a memory.

22. A method as claimed in claim 21, further comprising, if the indication indicates a detected spectrum opportunity, retrieving an identification of the spectrum opportunity corresponding to the indication from the indication.

23. A method as claimed in claim 22, wherein the indication comprises a Spectrum Access Grant message.

24. A method as claimed in claim 22, wherein the indication comprises a pilot signal received on the detected spectrum opportunity.

25. A method as claimed in claim 20, further comprising checking if the wireless device has data to be sent.

26. A method as claimed in claim 20, wherein the wireless device comprises a Machine Type Communication device.

27. A network node comprising:

an opportunity detection unit, configured to conduct spectrum opportunity detection within a spectrum band; and a communication unit, configured to indicate a result of the spectrum opportunity detection conducted by the opportunity detection unit to a wireless device managed by the network node and to provide an instruction to the wireless device to conduct one of sending an uplink transmission or listening for a downlink transmission on a detected spectrum opportunity;

wherein a spectrum opportunity comprises a channel within the spectrum band which is at least temporarily available for use by the wireless device; and wherein the network node and wireless device are licensed to use a spectrum band other than the spectrum band on which spectrum opportunity detection is conducted, and wherein instructing the wireless device to conduct one of sending an uplink transmission or listening for a downlink transmission on a detected spectrum opportunity comprises sending a message to the wireless device over a channel within the band in which the network node and wireless device are licensed to operate.

28. A network node as claimed in claim 27, wherein the opportunity detection unit comprises at least one of an interrogation unit or a sensing unit.

29. A network node as claimed in claim 27, wherein the communication unit is configured to conduct at least one of:

transmitting a Spectrum Access Grant message to the wireless device;

transmitting a Spectrum Access Denied message to the wireless device;

transmitting an availability flag to the wireless device;

transmitting a pilot signal to the wireless device;

withholding transmission of a pilot signal.

30. A network node as claimed in claim 27, wherein the network node comprises a radio access node.

31. A wireless device, comprising:

an indication detection unit configured to detect an indication of a result of spectrum opportunity detection conducted by a network node within a spectrum band; and a communication unit configured, if the indication indicates a detected spectrum opportunity, to conduct one of a transmission or reception operation on the detected spectrum opportunity and to provide an instruction to the wireless device to conduct one of sending an uplink transmission or listening for a downlink transmission on a detected spectrum opportunity;

wherein a spectrum opportunity comprises a channel within the spectrum band which is at least temporarily available for use by the wireless device; and wherein the network node and wireless device are licensed to use a spectrum band other than the spectrum band on which spectrum opportunity detection is conducted, and wherein instructing the wireless device to conduct one of sending an uplink transmission or listening for a downlink transmission on a detected spectrum opportunity comprises sending a message to the wireless device over a channel within the band in which the network node and wireless device are licensed to operate.

32. A wireless device as claimed in claim 31, wherein the wireless device comprises a Machine Type Communication device.

* * * * *

UNITED STATES PATENT AND TRADEMARK OFFICE

CERTIFICATE OF CORRECTION

PATENT NO. : 10,045,377 B2
APPLICATION NO. : 15/116098
DATED : August 7, 2018
INVENTOR(S) : Hoglund et al.

It is certified that error appears in the above-identified patent and that said Letters Patent is hereby corrected as shown below:

In the Drawings

In Fig. 5, Sheet 4 of 5, insert Main Designator -- 500 --.

In the Specification

In Column 10, Line 47, delete “step 450,” and insert -- step 440, --, therefor.

In the Claims

In Column 14, Line 33, in Claim 7, delete “signal, which” and insert -- signal, in which --, therefor.

Signed and Sealed this
Fourth Day of August, 2020

Andrei Iancu
*Director of the United States Patent and Trademark Office*